United States Patent [19]

Huber

[11] Patent Number: 5,052,729
[45] Date of Patent: Oct. 1, 1991

[54] LATCH FOR TRUCK TAILGATES

[76] Inventor: Keith L. Huber, P.O. Box 3368, Gulfport, Miss. 39466

[21] Appl. No.: 501,598

[22] Filed: Mar. 29, 1990

[51] Int. Cl.$^5$ ............................................. E05C 17/04
[52] U.S. Cl. .................................. 292/162; 296/57.1; 292/338; 292/246; 292/DIG. 29
[58] Field of Search ............... 292/246, 338, 272, 162, 292/DIG. 9, DIG. 29; 296/50, 57.1, 60

[56] References Cited

U.S. PATENT DOCUMENTS

| | | | |
|---|---|---|---|
| 535,442 | 3/1895 | Clark | 292/60 |
| 884,898 | 4/1908 | Correll | 292/60 X |
| 1,601,352 | 9/1926 | Dougherty | 292/246 |
| 2,968,507 | 1/1961 | Montgomery | 292/246 |
| 3,224,802 | 12/1965 | Pelcin | 292/246 |
| 4,249,420 | 11/1981 | Piepho | 292/338 X |

Primary Examiner—Richard E. Moore
Attorney, Agent, or Firm—Alexander F. Norcross

[57] ABSTRACT

The rear horizontal gate or tailgate of a truck is locked in a vertical or horizontal position by a pivoting horizontal bar. Fingers extend fixedly outward from the rear of the bed of a truck. The bar hinges are slit so that in the horizontal position they swing down over and grasp the fingers, holding the tailgate in a locked downward position. The tailgate is placed into an upward position by swinging the bar outward, freeing it from the fingers and raising the gate vertically. The weight of the horizontal bar swings down and the bar latches against the upper surface of the support fingers, holding the tailgate in a locked upward position. The tailgate thus can be locked in one of the two positions, up or down, while the truck is in motion without requiring the use of lock pins, simply by manipulation of the weighted horizontal bar and hinge member.

10 Claims, 2 Drawing Sheets

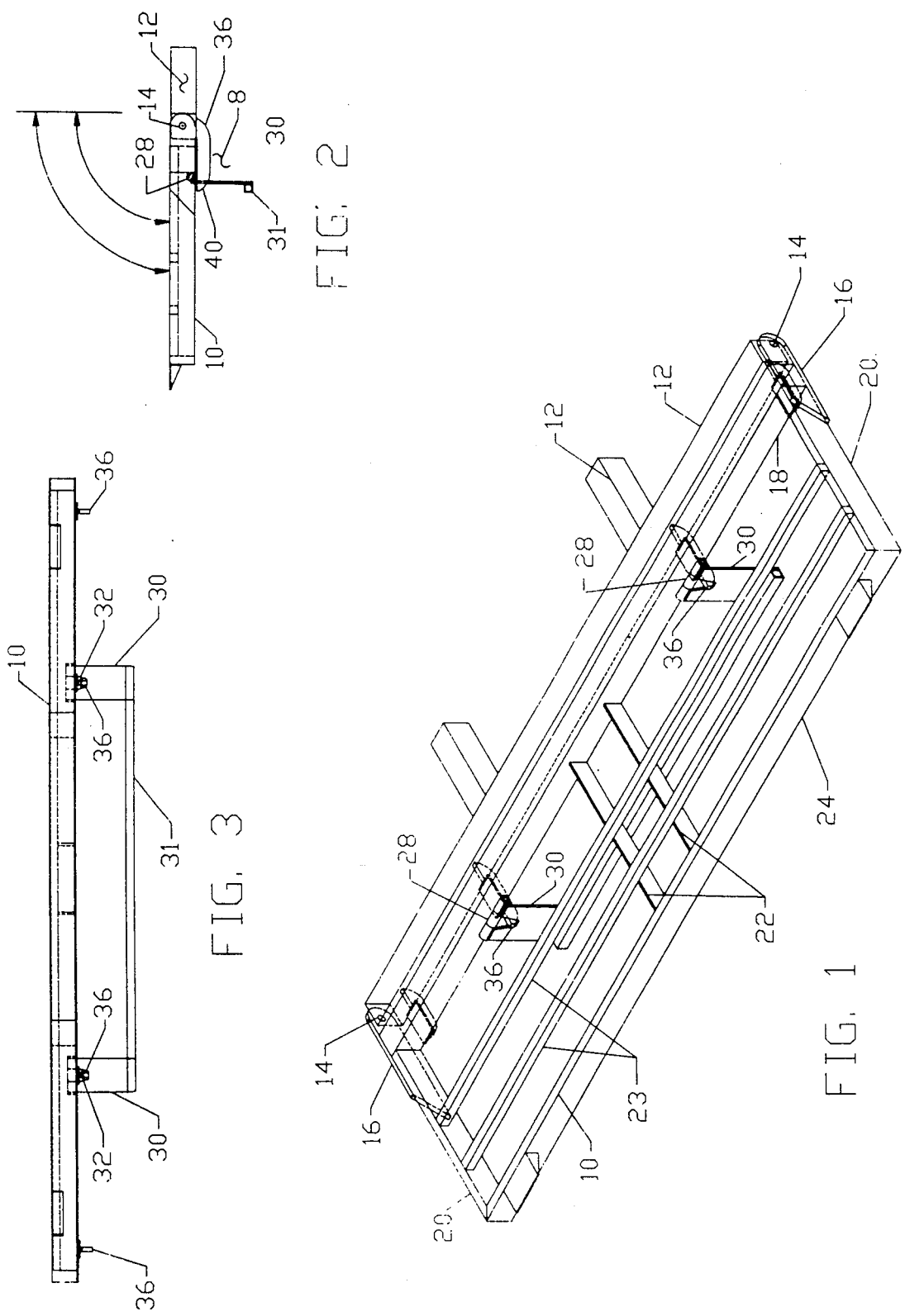

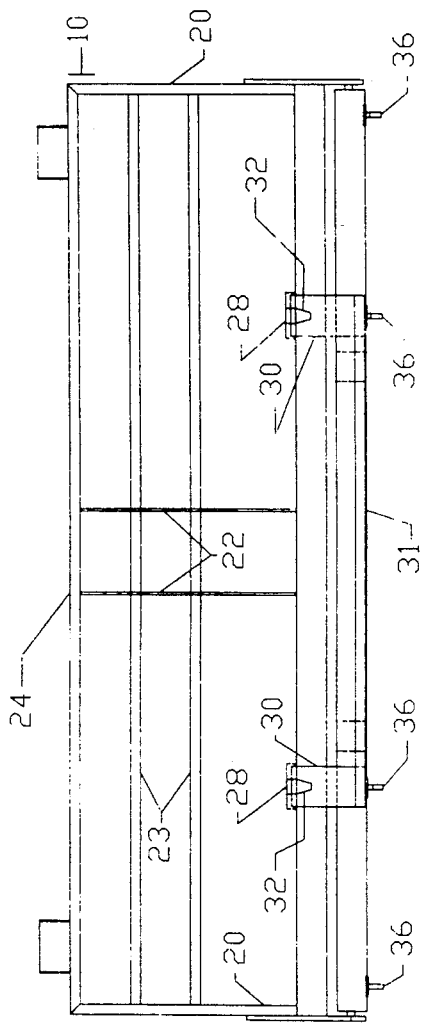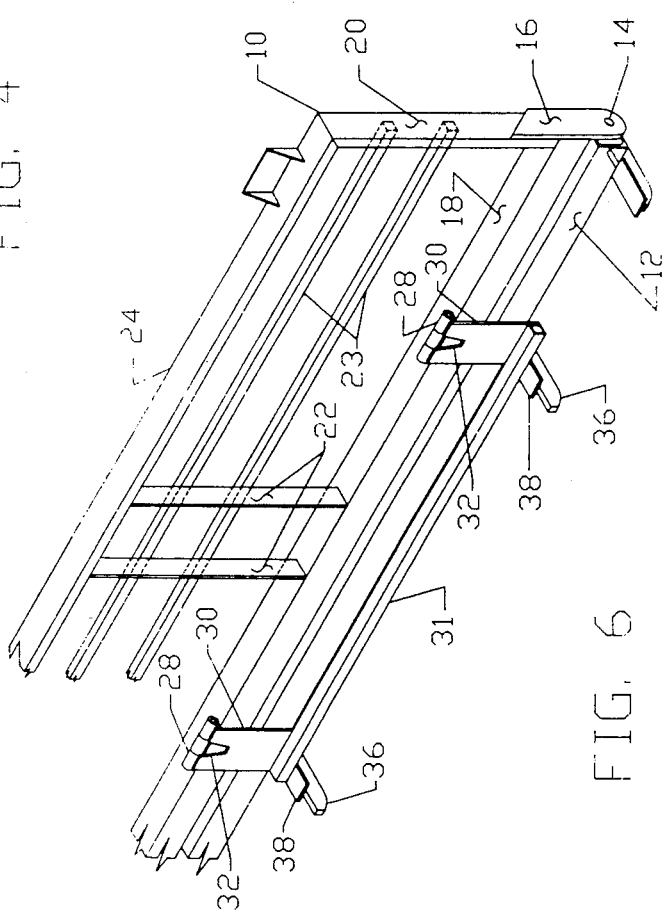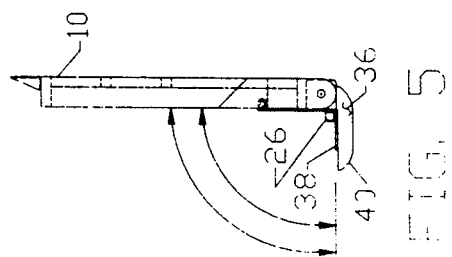

LATCH FOR TRUCK TAILGATES

BACKGROUND OF THE INVENTION

This invention relates to the field of truck tailgate structures, specifically to structures for locking truck tailgates into various operative positions.

U.S. Pat. No. 4,029,355 to Wilhelmsen discloses a locking mechanism for a tailgate (see FIGS. 3 and 4) in which the mechanism locks by being latched through extending pins into a provided elongate notches on an extension on either side of the truck bed body. Note that nothing secures this gate in a downward position other than the weight of the tailgate, and only the contact of the base of the tailgate (unnumbered but near numbered item 25, FIG. 2) supports the tailgate horizontally in a downward position.

U.S. Pat. No. 1,883,473 to Barrett discloses an adjustable tailgate mechanism in which a locking or latching hook (27) pivoted on an eccentric arm (28) is activated through rotation of a rock shaft (29) activated by lever (30) to release and then latch the tailgate in a downward or an upward position.

U.S. Pat. No. 2,891,816 to Meats discloses a tailgate fastening mechanism in which a pivoting lock hook is fastened to an axis which is then turned by a cam and an elongate member to release and latch a dump gate or a tail board on a tipping vehicle. Again, this mechanism shows no ability to lock the board in one of two positions.

U.S. Pat. No. 2,258,447 to Fairbank discloses a form of shielded hinge for a tailgate on a dump body but does not otherwise disclose a locking mechanism.

U.S. Pat. No. 2,689,764 to Park, in disclosing a removable lift gate assembly for installation on varying truck bodies discloses the use of a lip (9) for supporting the tailgate (7) in a downward position when opened.

U.S. Pat. No. 2,151,335 to Rush discloses a spring balancing mechanism for supporting the weight of the tailgate but does not show a mechanism for supporting the tailgate against any load in a horizontal position.

U.S. Pat. No. 3,574,391 to Deboze discloses a hinge construction for a vehicle tailgate which is designed to provide an unobstructed surface when the tailgate is fully opened.

U.S. Pat. No. 2,145,926 to Gooder discloses an alternative form of hinge, specifically mentioned as being for the side gate or drop side which permits the drop sides to be laterally slid as well as being opened and closed.

U.S. Pat. No. 2,821,942 to Goodwin, in disclosing an end door for a drop in gondola car discloses a mechanism for limiting the travel of a torsion spring retainer attached to a drop gate in which a bar, item 35, or block is pivoted about a rivet and has four sides providing four separate setting distances for latching an arm (30) for controlling the position of the arm in opening and lowering the drop in.

The patents taken together or individually do not disclose the mechanism of my invention in that they do not disclose a hinged bar, offset from the point of pivot of a tailgate which may be swung into two positions, a first position latching the tailgate in an upward position and a second position latching the tailgate downward or over and against supporting fingers against upward motion. Although several patents show tailgates resting on extended fingers, none show a weighed latch-down over the fingers, and none show a single mechanism which both latched up and down.

SUMMARY OF THE INVENTION

The invention is an apparatus for locking a tailgate either positively up or positively down, for carrying loads, by the ready manipulation of a single member. No pins or clamps are required for latching, and the tailgate can be easily set and locked in the desired position, with minimum effort on the part of the truck operator.

The rear horizontal gate or tailgate of a truck is locked in a vertical or horizontal position by a pivoting horizontal bar. Fingers extend fixedly outward from the rear of the bed of a truck. The bar hinges are slit so that in the horizontal position they swing down over and grasp the fingers holding the tailgate in a locked downward position. The tailgate is placed into an upward position by swinging the bar outward, freeing it from the fingers and raising the gate vertically. The weight of the horizontal bar swings down and the bar latches against the upper surface of the support fingers, holding the tailgate in a locked upward position. The tailgate thus can be locked in one of the two positions, up or down, while the truck is in motion without requiring the use of lock pins, simply by manipulation of the weighted horizontal bar and hinge member.

It is thus an object of this invention to show a latching mechanism that will latch a truck tailgate either in an upright or in a down position.

It is a further object of the invention to show a latching mechanism for a truck tailgate that may be set with minimum manipulation by the operator.

It is a further object of the invention to show a latching mechanism for a truck tailgate that does not require locking pins or clamps.

It is a further object of the invention to show a latching mechanism for a truck tailgate that resists release under vibration of normal truck travel.

These and other objects of the invention may be more readily seen from the detailed description of the preferred embodiment below.

BRIEF DESCRIPTION OF THE DRAWINGS

FIG. 1 is an angled view of the tailgate and mechanism of the invention in down, locked position.

FIG. 2 is a side view of the tailgate and mechanism of the invention in a down, locked position.

FIG. 3 is an end view of the tailgate and mechanism of the invention in a down, locked position, showing the locking bar in engagement.

FIG. 4 is an end view of the tailgate and mechanism of the invention in a raised, locked position.

FIG. 5 is a side view of the tailgate and mechanism of the invention in a raised, locked position.

FIG. 6 is an angled, sectional view of the tailgate and mechanism of the invention in a raised, locked position.

DETAILED DESCRIPTION OF THE PREFERRED EMBODIMENT

This invention relates to the locking of tailgates on trucks. As is known, trucks have a working body including a truck bed, mounted on a truck frame 12, which is the cargo carrying component of the truck. These truck beds may be enclosed with side walls, to form a box like load containing space, or may be unenclosed. A platform is pivotally affixed to the truck frame 12 to form a tailgate 10, which is lowered to gain access to the load, and maybe raised to reduce truck length during transit. If raised, the tailgate must be secured in the upright position by some positive locking means.

The tailgate 10, when lowered, forms an extension to the truck bed, and often serves as a useful extra load holding platform. However, when the truck is moved while the tailgate in lowered, some means must be provided for locking the tailgate in the lowered position, or the tailgate will bounce or move under the motion of the truck, tossing its load.

Such a tailgate locking means 8 must satisfy several requirements. It must be resistant to accidental unlatching; it must be easily set and released; and it should not be susceptible to damage or loss of removable parts.

I show such a tailgate locking mechanism. It combines the virtues of simplicity, and ease of use, yet is a structure which may be built strongly to resist damage in use.

Referring to the figures, I show a tailgate locking means 8, which is mounded on a truck tailgate 10. For clarity, I do not show the truck body other than to depict the truck frame attachment 12, where the tailgate pivot attachment point is located. The relation of the truck bed and the tailgate 10 is well understood in the art, and has many variants. It will be apparent to those skilled in the Art how this structure may be adapted to all trucks.

Tailgate attachment point 14 is the pivot axis of the tailgate 10 with respect to the truck body; while tailgates 10 may be attached through any of a number of hinge mechanisms, all tailgates 10 pivot about an axis defined as the pivot attachment point 14. The tailgate 10 pivots between an upright position (vertical with respect to the truck body) and a horizontal or downward position; an upright and a downward position is inherent in the concept of a lowerable tailgate.

In the invention as shown here, the tailgate 10 is supported in a horizontal load carrying position, as shown in FIGS. 1 and 2, by the invention, and is secured in that position by the inventive latch. In the description of the invention that follows, an open frame tailgate is shown; it should be clear how the invention may be applied to a solid tailgate 10.

Tailgate 10 is an open frame, based on a cross tailgate base bar member 18, affixed to the truck frame 12 by tailgate hinges 16, which define a tailgate pivot attachment point 14, an axis about which tailgate 10 pivots. Tailgate 10 further comprises side vertical supports 20, defining the sides of the tailgate, and which are joined by upper bar member 24 to form a generally rectangular shape. Additional intermediate vertical supports 22 and intermediate horizontal bars 23 provide stiffening and strength to the structure of the tailgate, and define a load carrying surface when tailgate 10 is horizontal.

Tailgate 10 is supported on a plurality of support fingers 36, substantially strong horizontal fingers which are fastened to truck frame 12, and extend rearward of the truck frame 12. The upper surface of support fingers 36 forms support surface 38, which may be strengthened by forming fingers 36 of a T-cross section material. In the horizontal position, at least tailgate base bar member 18 rests on support surface 38; the tailgate 10 is then horizontal because of the relative height of fingers 36 with respect to tailgate pivot point 14, which may be set for any desired thickness of tailgate.

Pivotally affixed to the tailgate is tailgate latch 26; in the described embodiment, latch 26 is fixed to the tailgate 10 through latch hinges 28 which are affixed to the upper edge of the base bar member 18. The location of the hinges 28 should be offset with respect to the tailgate pivot attachment point 14 and the finger upper support surface 38 as described below.

Flat tailgate latch hinge plates 30 pivot affix through hinges 28 and extend to a second end where each hinge plate is affixed to tailgate latch bar 31; this is a substantial, transverse bar, having significant weight and strength, and preferably having square or rectangular cross section. The weight of latch bar 31 forces hinge tailgate latch 26 to hang at all times in a downward direction from where it is hinged to tailgate 10. Bar 31 also provides a convenient handhold for manipulating latch 26.

Within each hinge plate 30, proximate latch hinge 28, is a vertical gripper notch 32. Notch 32 is sized to tightly enclose finger 36, having a height and width only sightly greater than the cross section of finger 32.

The length of hinge plates 30 and the size of latch bar 31 together define the length of latch 26; this length is chosen, together with the location of attachment of latch hinges 28, so that, when tailgate 10 is in the upper position, bar 31 fits tightly against finger support surface 38. A combination of tight fit, the weight of bar 31 and its friction against support surface (enhanced by bar 31's rectangular cross section) serve to hold latch 26 in position, providing an uplock to tailgate 10. This uplock is easily set by pushing bar 31 into position when the tailgate is raised, and easily unlocked by pulling bar 31 out of position, allowing latch 26 to swing free. If the bar 31 is raised and let go, the weight of bar 31 will be sufficient to swing latch 26 into a locked position.

Fingers 36 are provided with a curved lower cam face 40. The length of fingers is chosen to match the hinge plates 30 so that, when tailgate 10 is horizontal, and latch 26 is held out horizontal, fingers 36 just fit within the gripper notches 32, permitting hinge plates to lower over fingers 36. The curve of cam face 40 is chosen so that, as the weight of bar 31 pulls hinge plates 30 over fingers 36, cam face 40 reacts against gripper notch 32 to pull the hinge plates and thus the tailgate tightly down against the support fingers, locking the tailgate 10 in the horizontal position. Again engagement and disengagement of this lock occurs by manipulation of the bar 31, moving the latch 26 into or out of engagement with fingers 36.

The thickness of the tailgate 10 and the location of tailgate pivot point 14 largely determine the offset and location of the upper support surface 38, to provide a horizontal tailgate 10; this then locates the fingers 36 with respect to the truck frame 12. The relative offset of the latch hinge 28 and the tailgate pivot attachment point 14 sets the length of the hinge plate 30 and bar 31 necessary to lock the tailgate 10 in an upright position. The length of fingers 36 is then set as described above, the length of the hinge plates 30 (and thus the gripper notches 32) thus being predetermined. Cam face 40 should be a curve having a radius approximately that of the curve swept by gripper notch 32 when tailgate 10 is horizontal.

Although no locking pins are required to maintain the latch in its locked positions in normal use, such a safety pin may be provided where required by law or regulations. In simplist form, such a pin may be inserted through a provided hole (not shown) in one or more of fingers 36, either through the support surface 38 or sideways through finger 36, at a chosen position outboard of bar 31 or hinge plate 30.

It can thus be seen that a wide range of geometries is possible to the skilled designer, who may size the inventive latch 26 for desired strength and loads. It can be seen that, while an open frame tailgate 10 has been used as illustrative, a closed or solid tailgate may be readily adapted for the latch 26, which may be exterior to the tailgate, or recessed within its paneling. Thus the invention is not restricted to the exact embodiment depicted, but includes that wider range of equivalents inherent in the description and claims.

I claim:

1. An apparatus for locking a tailgate, pivotally affixed to a truck comprising:
    a locking finger extending substantially horizontally to the rear from the truck;
    a hinge plate pivotally affixed to the tailgate;
    means for biasing said hinge plate in a downward direction;
    said hinge plate interlocking with said locking finger in a down position; and
    said hinge plate supported on said locking finger in an upward position.

2. The apparatus of claim 1, wherein said hinge plate further comprises:
    a plate, having a lower end;
    said plate having means for gripping said support finger;
    said finger having means for urging said plate into a restrained, secured position, upon downward pivotal motion of said plate.

3. The apparatus of claim 2 above wherein said means for urging further comprise:
    a generally arcuate surface forming a bottom surface of said finger, cooperatively with a gripper notch in said hinge plate.

4. The apparatus of claim 1 above, further comprising:
    a plurality of said locking fingers.

5. The apparatus of claim 1 above wherein said means for biasing further comprises:
    a bar member, affixed at an end of said hinge plate.

6. An apparatus for locking a tailgate, pivotally affixed to a truck comprising:
    a plurality of locking fingers extending substantially horizontally to the rear from the truck;
    at least one hinge plate pivotally affixed to the tailgate;
    said hinge plate being pivotally affixed to the tailgate at a point offset from a point where the tailgate is affixed to the truck;
    means for biasing said hinge plate in a downward direction;
    said hinge plate interlocking with said locking finger in a down position; and
    said hinge plate supported on said locking finger in an upward position.

7. The apparatus of claim 6, wherein said hinge plate further comprises:
    a plate, having a lower end;
    said plate having means for gripping said support finger;
    said finger having means for urging said plate into a restrained, secured position, upon downward pivotal motion of said plate.

8. The apparatus of claim 7 above wherein said means for urging further comprise:
    a generally arcuate surface forming a bottom surface of said finger, cooperatively with a gripper notch in said hinge plate.

9. An apparatus for locking a tailgate, pivotally affixed at a tailgate hinge point to a truck bed, into an upward or downward position comprising:
    a plurality of hinge plates, pivotally affixed at a first end to the tailgate a spaced distance from the tailgate hinge point;
    a bar member affixed to a second end of each said hinge plate;
    a gripper notch within each hinge plate proximate said first end;
    a plurality of fingers extending horizontally rearward of the truck bed, each finger corresponding to a hinge plate;
    each said finger having an upper supporting surface;
    each said finger having an arcuate lower surface, cooperatively engaging said gripper notches.

10. The apparatus of claim 9 further comprising:
    said hinge plates being sized cooperatively with said fingers, said bar locking against said finger supporting surface when the tailgate is in an upward position.

* * * * *